(12) United States Patent
Nakano et al.

(10) Patent No.: US 10,591,765 B2
(45) Date of Patent: *Mar. 17, 2020

(54) DISPLAY DEVICE

(71) Applicant: Funai Electric Co., Ltd., Osaka (JP)

(72) Inventors: Kodai Nakano, Osaka (JP); Tatsuji Sudo, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 399 days.

This patent is subject to a terminal disclaimer.

(21) Appl. No.: 15/094,872

(22) Filed: Apr. 8, 2016

(65) Prior Publication Data

US 2016/0223854 A1 Aug. 4, 2016

Related U.S. Application Data

(63) Continuation of application No. 14/249,455, filed on Apr. 10, 2014, now Pat. No. 9,335,578.

(30) Foreign Application Priority Data

Apr. 12, 2013 (JP) .................................. 2013-084395

(51) Int. Cl.
*G02F 1/1333* (2006.01)
*G02F 1/13357* (2006.01)
*G02F 1/1335* (2006.01)

(52) U.S. Cl.
CPC ...... *G02F 1/133382* (2013.01); *G02F 1/1336* (2013.01); *G02F 1/133308* (2013.01);
(Continued)

(58) Field of Classification Search
CPC ....... H05K 9/0015; H05K 2201/10371; H05K 1/0215; H05K 7/20154; G11B 33/1493;
(Continued)

(56) References Cited

U.S. PATENT DOCUMENTS 5,671,123 A 9/1997 Omori et al.
5,731,952 A * 3/1998 Ohgami ................ G06F 1/1616
361/679.47
(Continued)

FOREIGN PATENT DOCUMENTS

EP 2434332 A1 3/2012
JP H04-50035 A 2/1992
(Continued)

OTHER PUBLICATIONS

Extended European Search Report issued in European Application No. 14164299.1 dated Aug. 22, 2014 (8 pages).
(Continued)

*Primary Examiner* — Huyen L Ngo
(74) *Attorney, Agent, or Firm* — Osha Liang LLP

(57) ABSTRACT

A display device includes a display that displays images, a light source that irradiates light toward a back surface of the display, a metal material that radiates heat generated by the light source, a protective part provided in proximity to the perimeter of the display, wherein the protective part opposes the metal material, and a conductive part interposed between and electrically connects the protective part and the metal material.

9 Claims, 8 Drawing Sheets

(52) U.S. Cl.
CPC ............ *G02F 2001/133314* (2013.01); *G02F 2001/133328* (2013.01); *G02F 2001/133334* (2013.01); *G02F 2001/133628* (2013.01); *G02F 2202/22* (2013.01); *Y10T 29/49002* (2015.01)

(58) Field of Classification Search
CPC ........ Y10T 29/49117; Y10T 29/49002; H04N 5/64; G02F 1/133308; G02F 1/133382; G02F 1/1336; G02F 2202/22; G02F 2001/133628; G02F 2001/133334; G02F 2001/133314; G02F 2001/133328; G03G 15/80; G03G 2215/0861; G03G 2221/166; G06F 1/1601
See application file for complete search history.

(56) References Cited

U.S. PATENT DOCUMENTS

| | | | | |
|---|---|---|---|---|
| 7,651,345 | B2* | 1/2010 | Tomioka | H01Q 1/2258 439/573 |
| 7,944,682 | B2* | 5/2011 | Park | G02F 1/133308 349/58 |
| 8,054,240 | B2* | 11/2011 | Honda | H01Q 9/40 343/702 |
| 2002/0067591 | A1* | 6/2002 | Tajima | H04N 5/64 361/679.21 |
| 2006/0065426 | A1 | 3/2006 | Anderson | |
| 2006/0092235 | A1* | 5/2006 | Sugahara | B41J 2/14233 347/65 |
| 2006/0290835 | A1* | 12/2006 | Sakuma | G02F 1/133308 349/58 |
| 2008/0205004 | A1* | 8/2008 | Ueno | G11B 33/142 361/701 |
| 2010/0213499 | A1* | 8/2010 | Yamamoto | H01L 25/167 257/99 |
| 2010/0243872 | A1* | 9/2010 | Amano | H01L 27/14618 250/238 |
| 2012/0063113 | A1* | 3/2012 | Hisakawa | G02F 1/133308 361/807 |
| 2012/0162566 | A1* | 6/2012 | Shimomichi | G02F 1/133308 349/58 |
| 2013/0039021 | A1* | 2/2013 | Liu | G02F 1/133308 361/748 |

FOREIGN PATENT DOCUMENTS

| | | |
|---|---|---|
| JP | H04-86648 A | 3/1992 |
| JP | 2001-013887 A | 1/2001 |
| JP | 2006216244 A | 8/2006 |
| JP | 2007-011012 A | 1/2007 |
| JP | 2011-133545 A | 7/2011 |
| JP | 2011-185956 A | 9/2011 |
| JP | WO 2012014601 A1 * | 2/2012 ........ G02F 1/133308 |
| KR | 101047726 B1 | 7/2011 |
| WO | 2011/058846 A1 | 5/2011 |
| WO | 2012/014601 A1 | 2/2012 |
| WO | 2013/046765 A1 | 4/2013 |

OTHER PUBLICATIONS

Office Action in corresponding Japanese Patent Application No. 2013-084395 dated Feb. 7, 2017, with translation (9 pages).
Extended European Search Report issued in European Application No. 17155347.2 dated Jun. 28, 2017 (20 pages).

* cited by examiner

DISPLAY DEVICE

CROSS-REFERENCE TO RELATED APPLICATIONS

The present application is a continuation application of and, thereby, claims benefit under 35 U.S.C. § 120 to U.S. patent application Ser. No. 14/249,455 filed on Apr. 10, 2014, titled, "DISPLAY DEVICE," which claims priority to Japanese Patent Application No. JP2013-084395, filed on Apr. 12, 2013. The contents of the priority applications are incorporated by reference in their entirety.

TECHNICAL FIELD

The present invention relates to a display device such as a liquid crystal display device.

BACKGROUND TECHNOLOGY

Conventionally, in a liquid crystal display device, sheet metal of zero potential and a bezel are electrically connected using a screw as a countermeasure against electrostatic discharge (ESD) or electromagnetic interference (EMI).

FIG. 7 is a diagram illustrating a configuration of a rear frame of a conventional liquid crystal display device.

A rear frame 180 is configured by combining a top frame 180A composed of sheet metal, a left frame 180B likewise composed of sheet metal, a right frame 180C likewise composed of sheet metal, and a bottom frame 180D likewise composed of sheet metal.

In the rear frame 180, any one of the frames 180A to 180D is grounded. The entire rear frame 180 thereby becomes zero potential. Moreover, because one of the frames 180A to 180D is electrically connected to the bezel, the bezel also becomes zero potential.

Because the bezel and the rear frame 180 thereby become zero potential, it becomes difficult for electrostatic discharge to occur in the bezel or the rear frame 180, and it becomes possible to protect components inside the liquid crystal display device from electromagnetic interference.

RELATED ART DOCUMENTS

Patent Documents

[Patent Document 1] Japanese Unexamined Patent Application Publication No. 2007-11012

However, in recent years, configuring the rear frame from resin is desirable for cost reduction. However, when the rear frame is configured of resin, the rear frame and the bezel are not electrically connected because resin has insulating properties. In this case, it becomes easier for electrostatic discharge or electromagnetic interference to occur.

SUMMARY OF THE INVENTION

One or more embodiments of the present invention provide a display device that can enact countermeasures against electrostatic discharge and/or electromagnetic interference even when a rear frame is configured of resin.

According to one or more embodiments, a display device may comprise: a display that displays images; a light source that irradiates light toward a back surface of the display; a metal material that radiates heat generated by the light source; a protective part provided in proximity to the perimeter of the display, wherein the protective part opposes the metal material; and a conductive part interposed between and electrically connects the protective part and the metal material.

According to one or more embodiments of this configuration, for example, the conductive part electrically connects the protective part that opposes the metal material and the metal material. Because of this, the protective part and the metal material become zero potential, static electricity becomes less likely to occur in the protective part and the metal material, and components inside the display device can be protected from electromagnetic interference.

As a result, for example, countermeasures against electrostatic discharge and/or electromagnetic interference can be enacted even when a rear frame is configured of resin.

According to one or more embodiments, the protective part may comprise an opening, and the conductive part may be interposed between the protective part and the metal material and blocks the opening.

According to one or more embodiments this configuration, for example, because the opening is formed on the protective part opposing the metal material, and the conductive part contacts the protective part and blocks the opening, a worker or the like looking in the opening can visually recognize if the conductive part is inadvertently not disposed during an assembly process of the display device.

According to one or more embodiments, the protective part may comprise: a conductive layer; a plating layer layered on a front surface of the conductive layer; and another plating layer layered on a back surface of the conductive layer, and the opening of the protective part may be formed by applying a burring process to the protective part.

According to one or more embodiments of this configuration, for example, the protective part is formed by layering the plating layer on the front and back surfaces of the conductive layer, and the opening of the protective layer opposing the metal material is formed by applying the burring process.

As a result, for example, the conductive layer is exposed in the opening even when the front and back surfaces of the protective part opposing the metal material are plating layers with conductivity, and the protective part opposing the metal material and the metal material can therefore be electrically connected.

According to one or more embodiments, the metal material may comprise a cut and raised portion formed in a direction toward the protective part, and the conductive part may contact the cut and raised portion.

As a result, for example, because the cut and raised portion is formed in the direction toward the protective part on the metal material, a length of the conductive part can be reduced by a height of the cut and raised portion.

As a result, for example, a reduction in cost can be provided.

According to one or more embodiments, the metal material may further comprise a raised part formed in a direction toward the protective part, and the conductive part may contact the raised part.

According to one or more embodiments of this configuration, because the raised part is formed in the direction toward the protective part on the metal material, the length of the conductive part can be reduced by a length of the raised part.

As a result, for example, a reduction in cost can be provided.

According to one or more embodiments, the conductive part may be a gasket having conductivity.

As a result, for example, because the conductive material is formed by the conventionally existing gasket having conductivity, there is no need to create a new, dedicated conductive part. A reduction in cost, for example, can therefore be provided.

According to one or more embodiments, the conductive part may be elastic.

As a result, for example, because the conductive part has elasticity, the conductive part firmly contacts a discharge plate and the protective part opposing the discharge plate. As a result, a firm electrical connection between the discharge plate and the protective part can be performed.

According to one or more embodiments of the present invention, countermeasures against electrostatic discharge and/or electromagnetic interference can be enacted even when the rear frame is configured of resin.

DETAILED DESCRIPTION OF EMBODIMENTS

Embodiments of the present invention will be described in detail below using drawings. In the present embodiments a liquid crystal display device is exemplified as a display device relating to the embodiments of the present invention, but the present invention is not limited thereto and may use any device that seeks countermeasures against electrostatic discharge and/or electromagnetic interference.

Furthermore, each embodiment described below illustrates a comprehensive or specific example of the present invention. Components, disposed positions and connection modes of the components, and the like illustrated in the embodiments below are but an example and not meant to limit the present invention. Moreover, among the components in the embodiments below, components not described in the independent claims, which provide the highest level description, will be described as optional components.

First Example (Configuration of Liquid Crystal Display Device)

Figure 1:
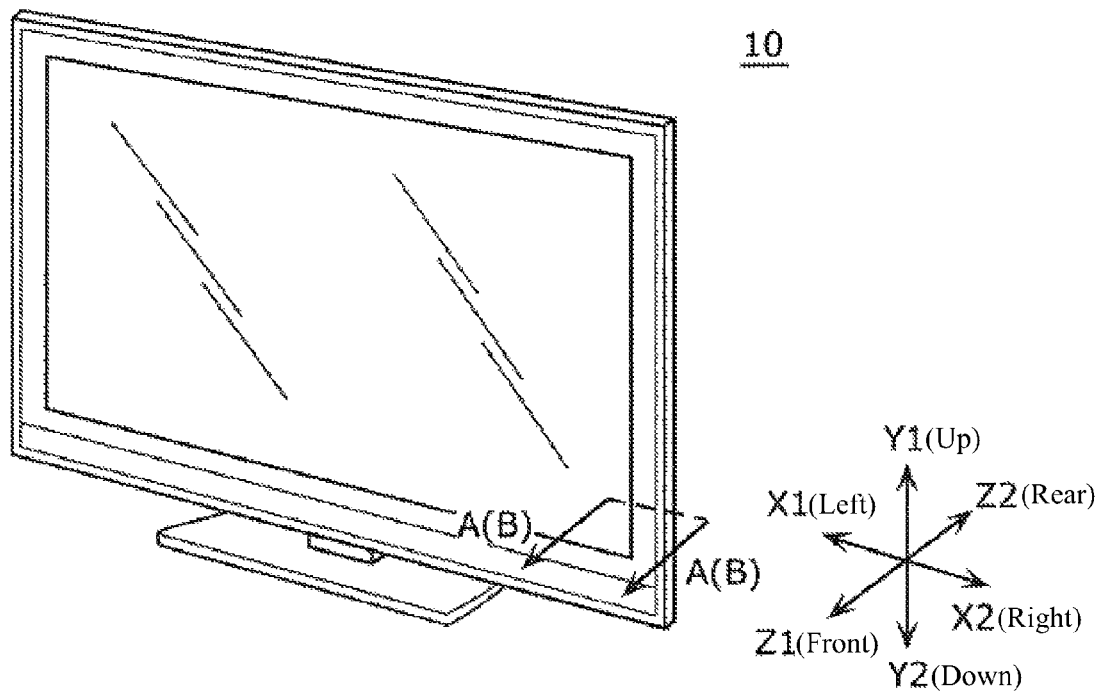
FIG. 1 is a perspective view illustrating an external appearance of a liquid crystal display device according to one or more embodiments of a first example of the present invention.
Figure 2:
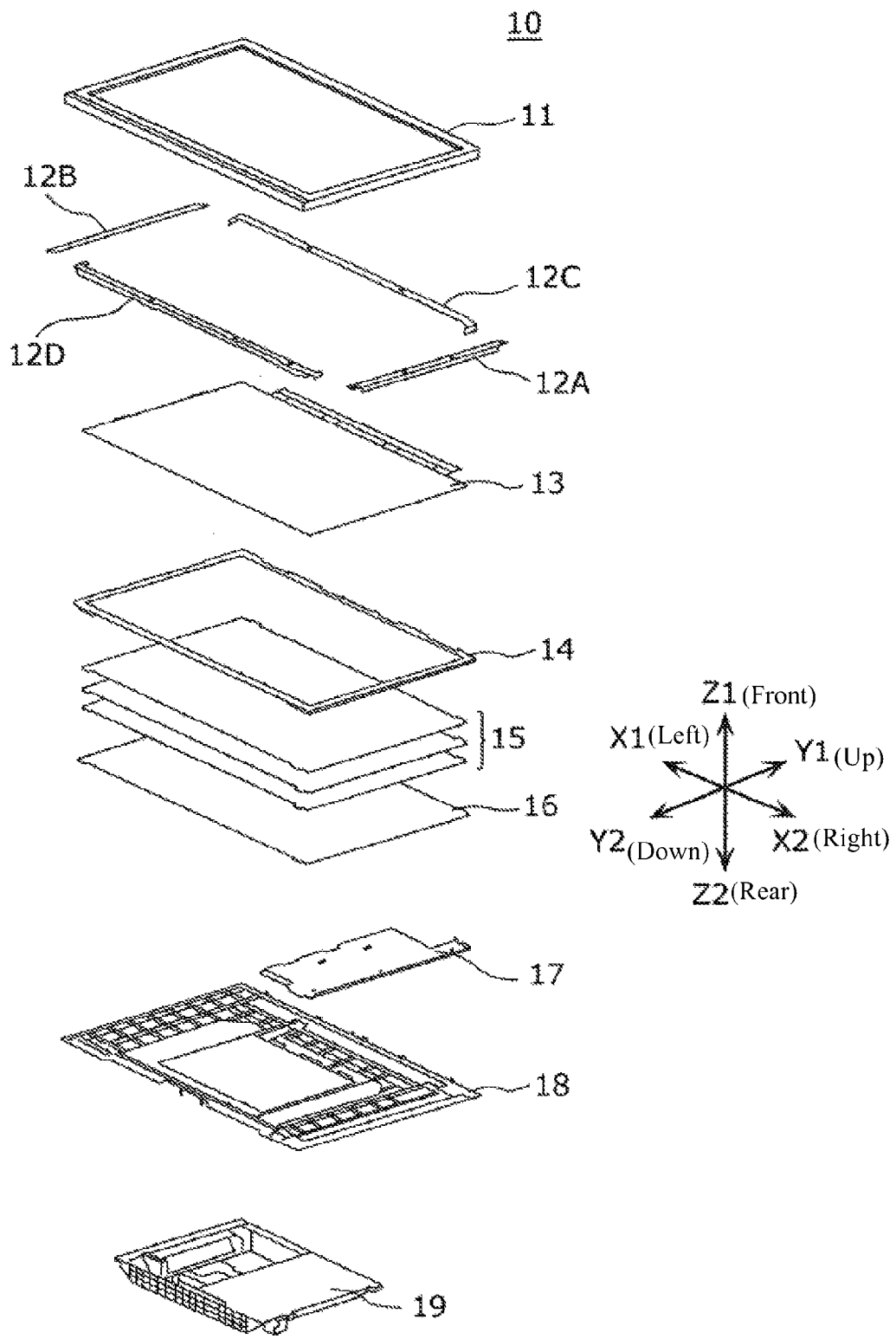
FIG. 2 is an exploded perspective view illustrating an exploded state of the liquid crystal display device in FIG. 1 according to one or more embodiments of the first example.

FIG. 1 is a perspective view illustrating an example of an external appearance of a liquid crystal display device relating to one or more embodiments of a first example of the present invention. FIG. 2 is an exploded perspective view illustrating an exploded state of the liquid crystal display device in FIG. 1. In FIGS. 1 and 2, "X1 direction" represents a left direction and "X2 direction" a right direction. Moreover, "Y1 direction" represents an up direction and "Y2 direction" a down direction. Moreover, "Z1 direction" represents a front direction and "Z2 direction" a rear direction.

As illustrated in FIG. 2, a liquid crystal display device 10 is provided with a front cabinet 11, bezels (protective parts) 12A to 12D, a liquid crystal panel (display) 13, a mold frame 14, an optical sheet 15, a light guide plate 16, a heat radiating plate (metal material) 17, a rear frame 18, and a rear cover 19. The optical sheet 15 is configured from a plurality of members such as a diffusion plate.

The bezels 12A to 12D are provided along (in proximity to) an outer frame (perimeter) of the liquid crystal panel 13 to protect the outer frame. Among the bezels 12A to 12D, the bezel 12A on a right side is an opposing bezel (opposing protective part) that opposes the heat radiating plate 17. Therefore, the bezel 12A on the right side is referred to below as an opposing bezel 12A.

A frame configured from the bezels 12A to 12D is formed by mounting the bezel on the right side (i.e., the opposing bezel) 12A, the bezel 12B on a left side, the bezel 12C on a top side, and the bezel 13D on a bottom side to the outer frame of the liquid crystal panel 13.

The mold frame 14 is a frame for supporting the frame of the liquid crystal panel 13 from a back surface side thereof. As will be described below, a space that disposes the liquid crystal panel 13 and a rib for forming a space that disposes the optical sheet 15 are provided on the mold frame 14.

Figure 4:
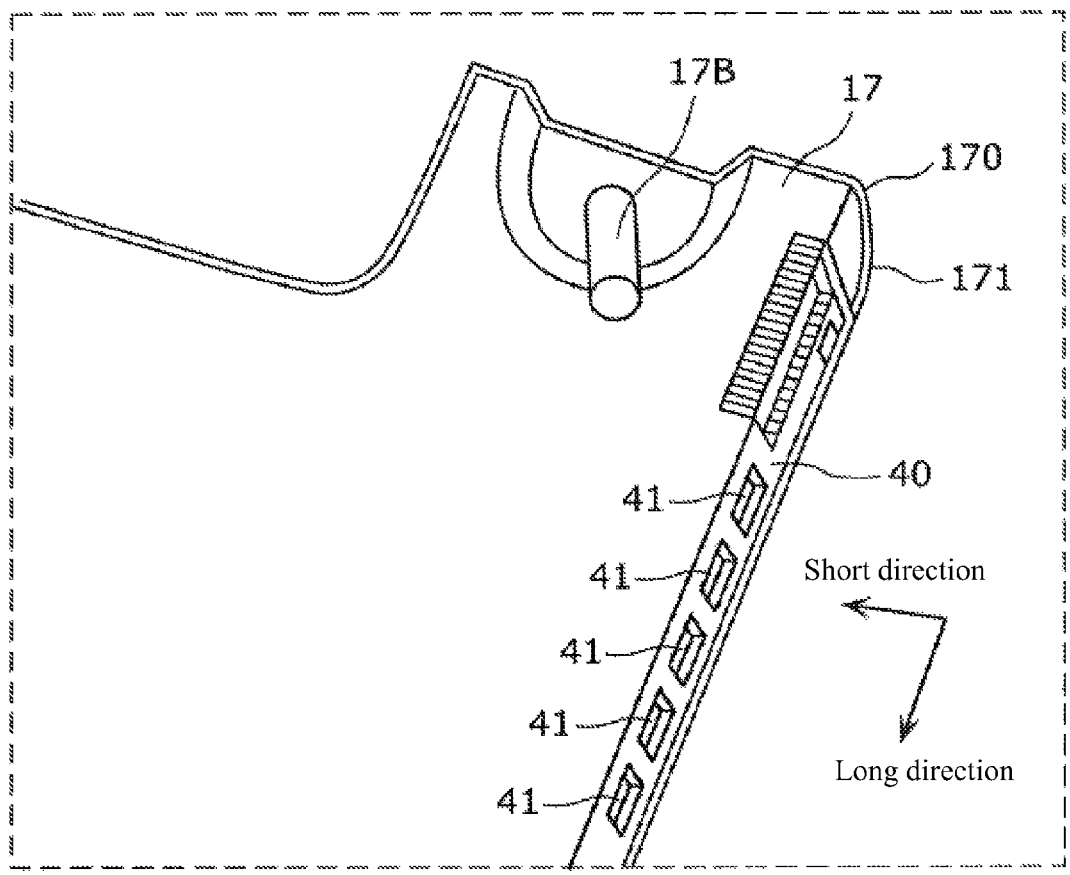
FIG. 4 is a perspective view illustrating of a configuration of a main portion of the heat radiating plate according to one or more embodiments of the first example.

The light guide plate 16 is provided on the heat radiating plate 17 so that a right end thereof opposes an LED 41 (see FIG. 4). The light guide plate 16 is configured of, for example, acrylic resin or the like, and guides light irradiated from the LED 41 to a reflective sheet that will be described below.

The heat radiating plate 17 is formed of metal with high conductivity, such as aluminum or the like. As will be described below, a plurality of LEDs 41 are disposed in a vertical direction on a right side of the heat radiating plate 17. The heat radiating plate 17 radiates heat generated by each LED 41 into the atmosphere.

The rear frame 18 is formed of resin having insulating properties, such as plastic.

(Configuration of Main Portion of the Liquid Crystal Display)

Figure 3A:
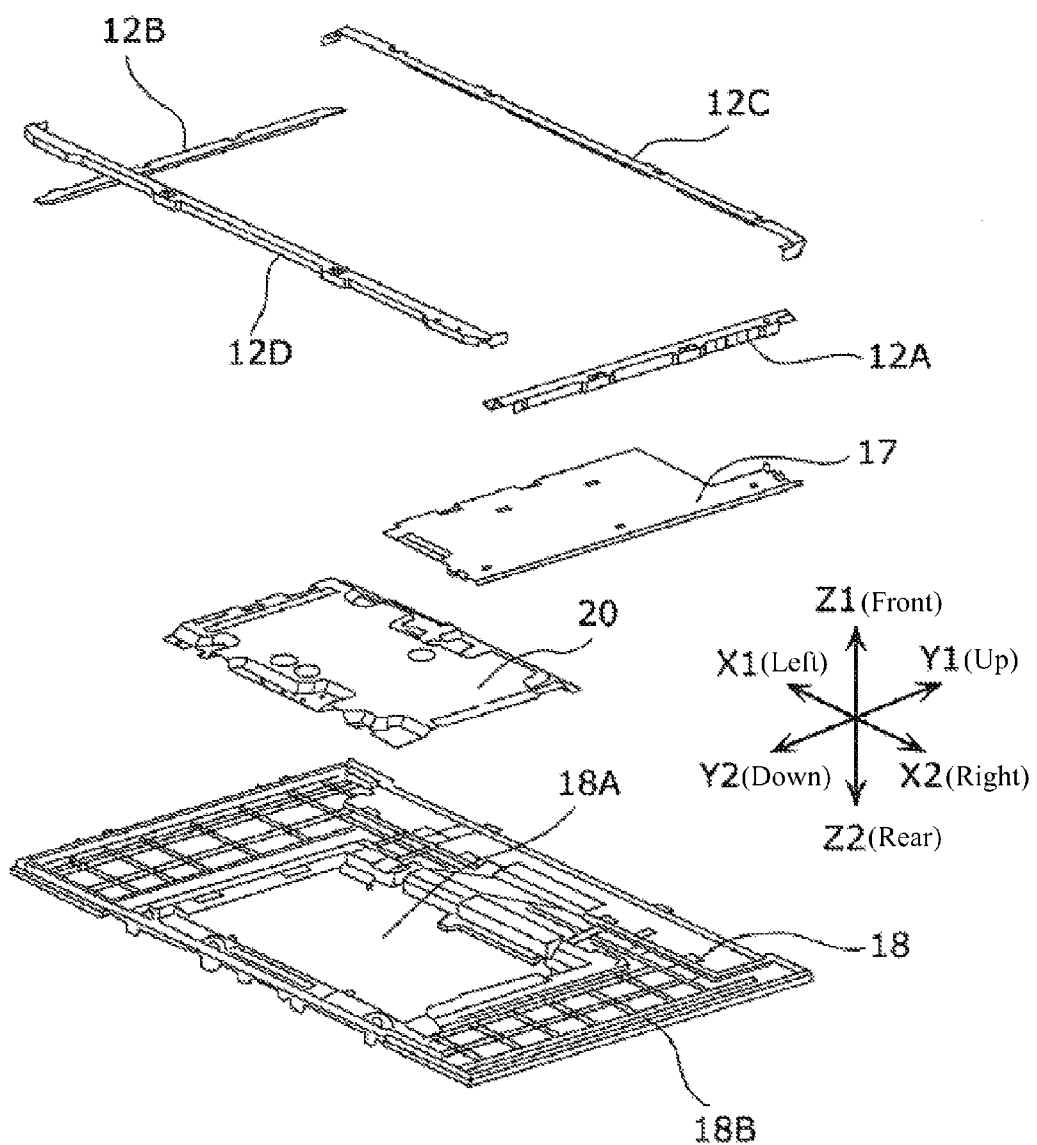
FIG. 3A is an exploded perspective view representing a main portion of a liquid crystal display according to one or more embodiments of the first example.
Figure 3B:
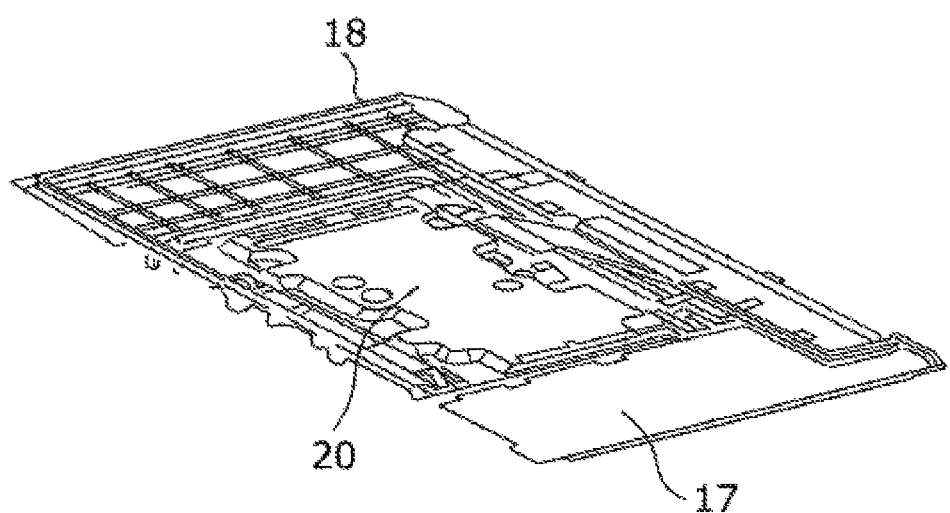
FIG. 3B is a perspective view illustrating a state where a substrate mounting part and a heat radiating plate are mounted to a rear frame according to one or more embodiments of the first example.

FIG. 3A is an exploded perspective view representing a main portion of a liquid crystal display relating to one or more embodiments of the first example of the present invention. FIG. 3B is a perspective view illustrating a state where a substrate mounting part 20 and the heat radiating plate 17 are mounted to the rear frame 18.

As illustrated in FIG. 3A, an opening 18A into which the substrate mounting part 20 is fitted is formed on the rear frame 18. The substrate mounting part 20 is formed of a conductive body such as aluminum, and a substrate (not illustrated) mounted with electronic components is mounted on a back surface thereof. The substrate mounting part 20 is fitted into the opening 18A with the substrate mounted on the back surface thereof.

Furthermore, a heat radiating plate mounting part 18B with a shape that follows an outline of the heat radiating plate 17 is formed on the rear frame 18. As illustrated in FIG. 3B, the substrate mounting part 20 and the heat radiating plate 17 make contact when the heat radiating plate mounting part 18B is mounted on the heat radiating plate 17 in a state where the substrate mounting part 20 is fitted into the opening 18A. The substrate mounting part 20 and the heat radiating plate 17 are thereby electrically connected.

FIG. 4 is a perspective view illustrating an example of a configuration of a main portion of the heat radiating plate 17. The heat radiating plate 17 is bent 90° relative to a top surface of the heat radiating plate 17 in a bent portion 170 that is parallel to a long direction of the heat radiating plate 17. A bent portion 171 that extends in the long direction of the heat radiating plate 17 is thereby formed.

An LED bar (light source) 40 is provided on a short direction side of the heat radiating plate 17 on the bent portion 171 so as to irradiate light from the LED 41 toward a short direction of the heat radiating plate 17. The plurality of LEDs 41 is linearly disposed on the LED bar 40. This LED bar 40 is disposed along the long direction of the heat radiating plate 17. The light guide plate 16 is disposed on the heat radiating plate 17 so that a lateral surface thereof follows along the LED bar 40.

Furthermore, a raised part 17B is formed on the heat radiating plate 17. Functions of the raised part 17B will be described below.

Figure 5:
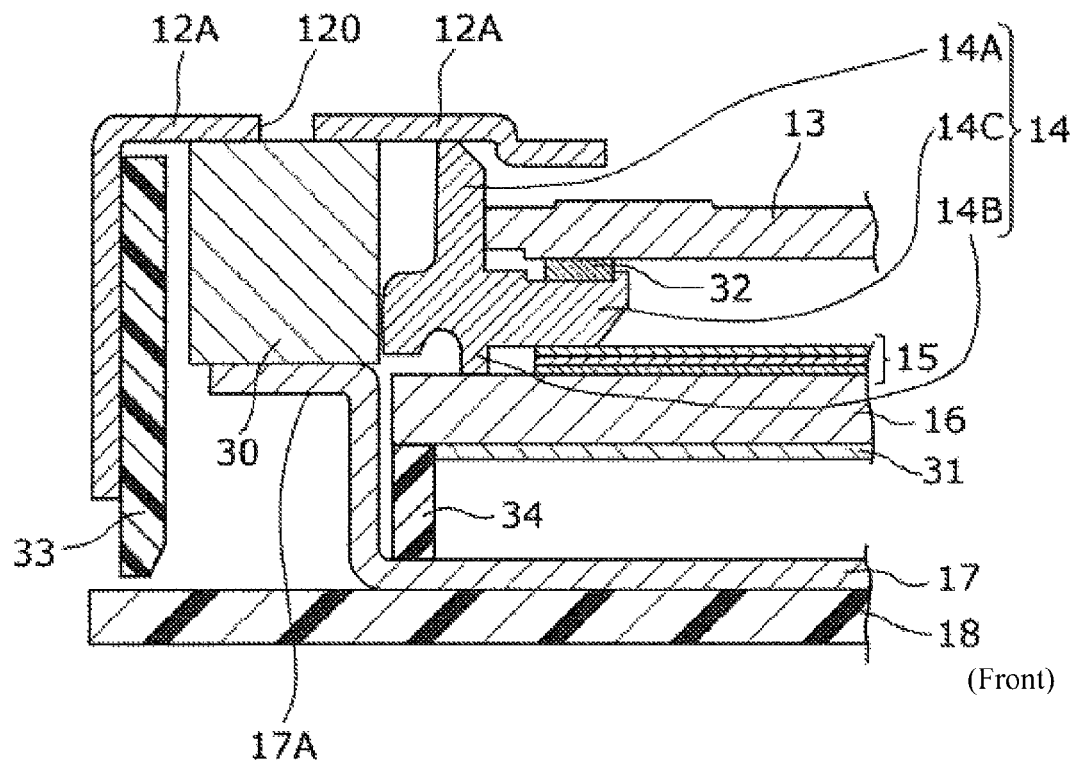
FIG. 5 is a cross-sectional view along line A-A in FIG. 1 according to one or more embodiments of the first example.
Figure 5:
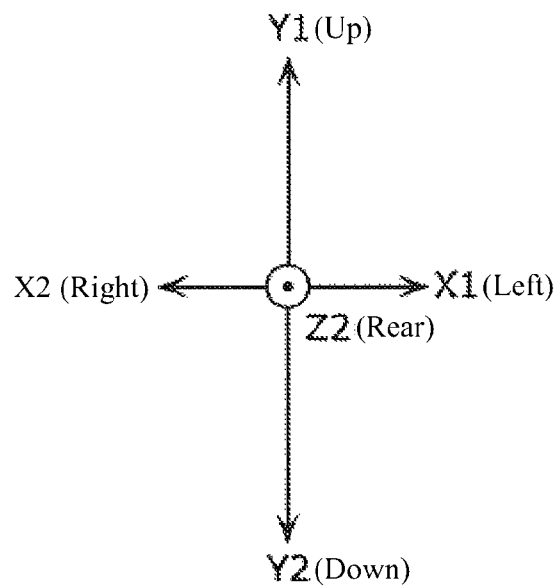

FIG. 5 is a cross-sectional view along line A-A in FIG. 1. In FIG. 5, an illustration and description of the front cabinet 11 will be omitted for ease of the description. Moreover, in FIG. 5, "X1 direction" represents a left direction and "X2 direction" a right direction of the liquid crystal display device 10. Moreover, "Y1 direction" represents an up direction and "Y2 direction" a down direction of the liquid crystal display device 10. Moreover, "Z2 direction" represents a rear direction of the liquid crystal display device 10.

As described above, the heat radiating plate 17 is mounted on a top surface of the rear frame 18. The light guide plate 16 is disposed on the top surface of the heat radiating plate 17 via a cushion member 34. The reflective sheet 31 is disposed so as to cover a back surface of the light guide plate 16. The mold frame 14 is disposed on the light guide plate 16.

The mold frame 14 is provided with a first rib 14A, a second rib 14B, and a frame body 14C. The first rib 14A secures a region where the liquid crystal panel 13 is disposed by a tip of the first rib 14A contacting the opposing bezel 12A. The liquid crystal panel 13 is disposed in this region.

The second rib 14B secures a region where the optical sheet 15 is disposed by contacting an upper front surface of the light guide plate 16. The optical sheet 15 is disposed in this region.

The frame body 14C supports the liquid crystal panel 13 from a back surface of the liquid crystal panel 13 via a cushion member 32 formed of resin such as a high-density micro-cell polymer sheet (PORON) or silicon.

The opposing bezel 12A is disposed so that an upper portion thereof opposes the heat radiating plate 17. A cut and raised portion 17A is formed in a direction toward the opposing bezel 12A on an end portion of the heat radiating plate 17. A resin 33 for protecting an inner side of a right portion of the opposing bezel 12A is disposed between the right portion of the opposing bezel 12A and the cut and raised portion 17A.

An opening 120 is formed on an upper portion side of the opposing bezel 12A. A conductive member 30 (conductive part) is disposed between the upper portion side of the opposing bezel 12A and the cut and raised portion 17A. This conductive member 30 is configured from, for example, a gasket having conductivity and contacts the upper portion side of the opposing bezel 12A and the cut and raised portion 17. The opposing bezel 12A and the heat radiating plate 17 are thereby electrically connected.

When configuring the conductive member 30 from the gasket, the gasket has elasticity. If the conductive member 30 has elasticity, the conductive member 30 firmly contacts the opposing bezel 12A and the cut and raised portion 17A due to elasticity.

(Operation of the Liquid Crystal Display Device)

Next, an operation of the liquid crystal display device according to one or more embodiments will be briefly described. In this liquid crystal display device 10, lighting the plurality of LEDs 41 (see FIG. 4) emits light from the plurality of LEDs 41.

The light from the plurality of LEDs 41 becomes incident to the lateral surface of the light guide plate 16. The light incident to the lateral surface of the light guide plate 16 is transmitted inside the light guide plate 16 while being reflected by the reflective sheet 31 and is emitted in a front direction from the top surface of the light guide plate 16. The light emitted from the top surface of the light guide plate 16 becomes incident to the back surface of the liquid crystal panel 13 after passing through the optical sheet 15.

In the liquid crystal display device 10 of such a configuration, the LED 41 generates heat. This heat is transmitted to the heat radiating plate 17. The heat transmitted to the heat radiating plate 17 is radiated into the atmosphere.

As described above, according to one or more embodiments of the first example of the invention, interposing the conductive member 30 between the opposing bezel 12A and the heat radiating plate 17 electrically connects the opposing bezel 12A and the heat radiating plate 17.

Because the opposing bezel 12A, the bezels 12B to 12D electrically connected to the opposing bezel 12A, and the heat radiating plate 17 thereby become zero potential, it becomes difficult for static electricity to form in the bezels 12A to 12D or the heat radiating plate 17, and it becomes possible to protect components inside the liquid crystal display device 1 (for example, the liquid crystal panel) from electromagnetic interference.

As a result, countermeasures against electrostatic discharge and/or electromagnetic interference can be enacted even when the rear frame 18 is configured of resin.

Furthermore, a shape of the heat radiating plate 17 does not need to be made complex for screwing because there is no need to screw together the opposing bezel 12A and the heat radiating plate 17. As a result, a finishing precision of the heat radiating plate 17 improves, and the heat radiating plate 17 becomes less likely to warp. Because an irradiation range of the LED 41 thereby becomes less likely to change, reduction in image quality on the liquid display panel 13 can be reduced.

Furthermore, the conductive member 30 is exposed from the opening 120 because the opening 120 is formed on a front portion of the opposing bezel 12A. Forgetting to dispose the conductive member 30 in an assembly configuration of the liquid crystal display device 10 can thereby be reduced by a worker or the like looking in the opening 120.

Furthermore, a length of the conductive member 30 can be reduced by a height of the cut and raised portion 17A because the cut and raised portion 17A is formed on the heat radiating plate 17. As a result, a reduction in cost can be provided.

In FIG. 5, the conductive member 30 can be prevented from falling off if the conductive member 30 is clamped and fixed by the resin 33 and the mold frame 14.

Second Example

Figure 6:
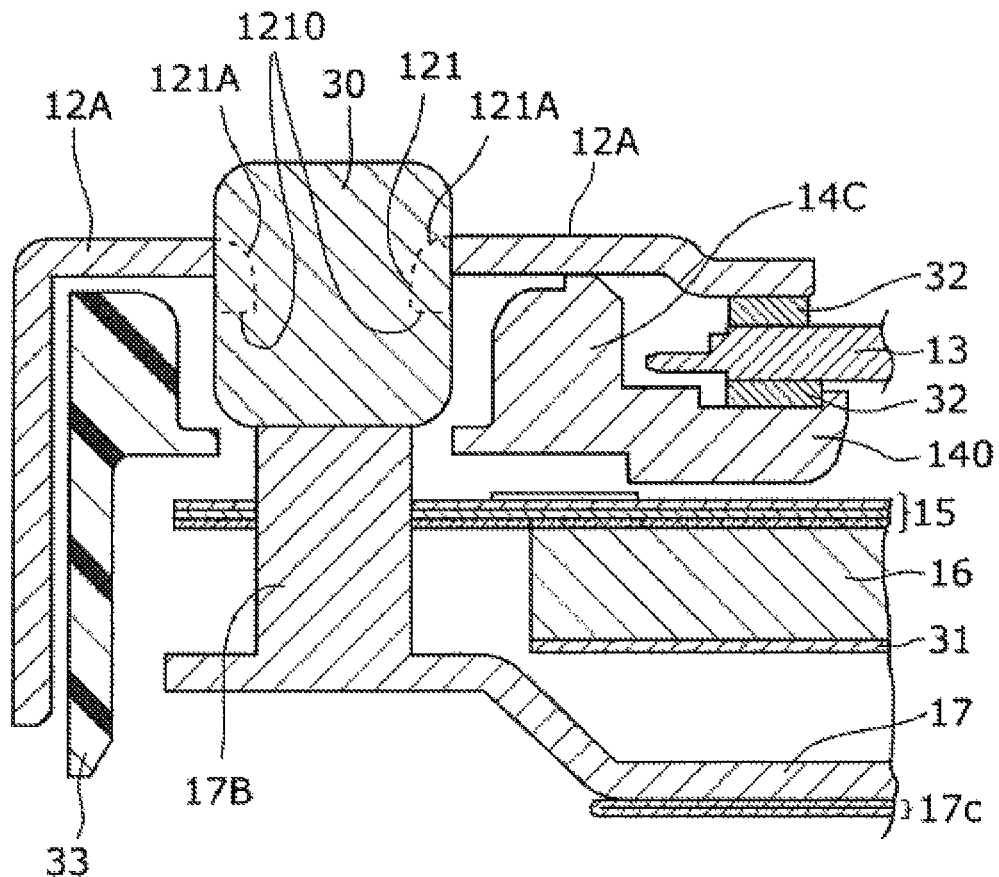
FIG. 6 is a cross-sectional view representing a main portion of a liquid crystal display device according to one or more embodiments of a second embodiment of the present invention.
Figure 6:
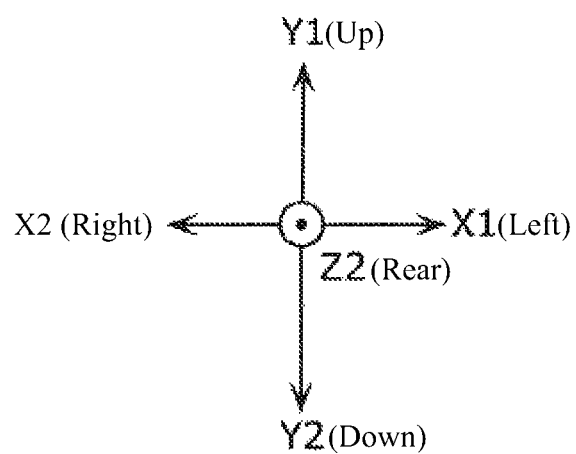
Figure 7:
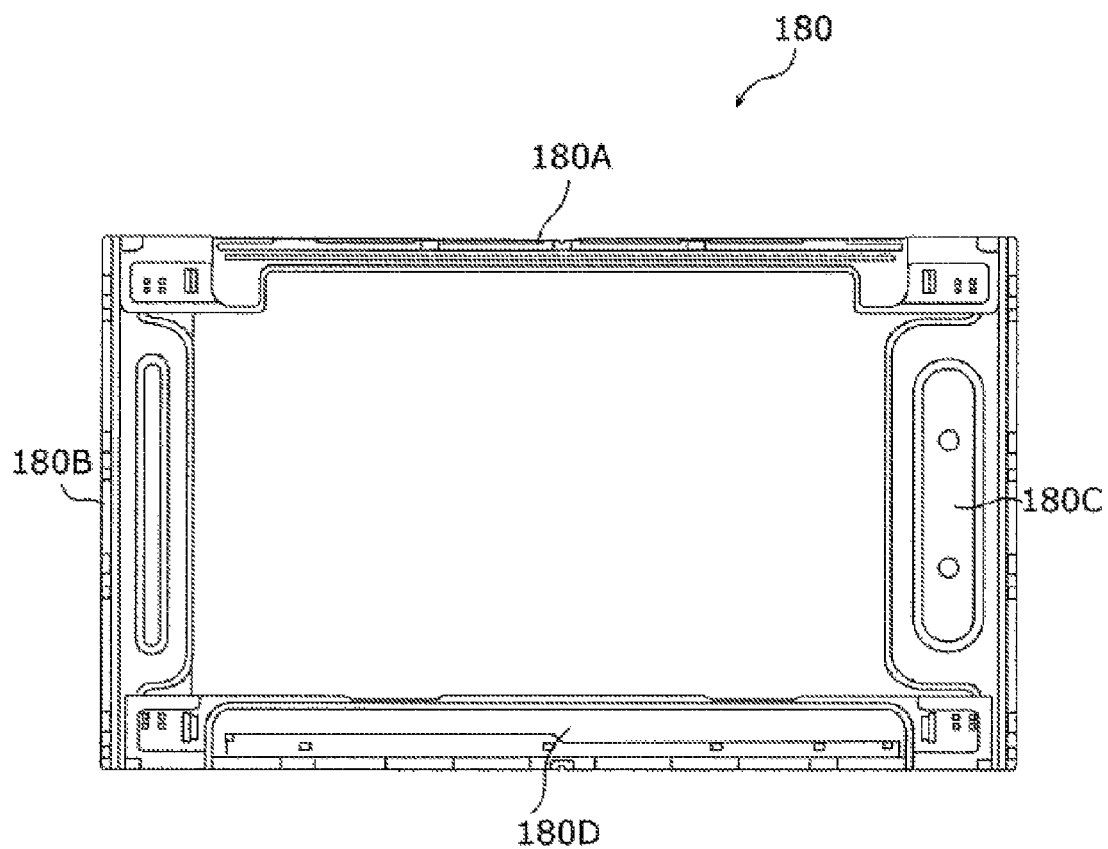
FIG. 7 is a diagram illustrating a configuration of a rear frame of a conventional liquid crystal display device according to one or more embodiments of the second embodiment.

FIG. 6 is a cross-sectional view representing a main portion of a liquid crystal display device relating to one or more embodiments of a second embodiment of the present invention. This cross-sectional view is a cross-sectional view along line B-B in FIG. 1. Moreover, the same reference numerals will be used for the same components as in FIG. 5 and descriptions thereof omitted.

As illustrated in FIG. 6, a raised part 17B is provided in a direction toward an opposing bezel 12A on a heat radiating plate 17. As illustrated in FIG. 4, this raised part 17B is configured by a cylindrical metal member being mounted by welding on a top surface of the heat radiating plate 17.

An optical sheet 15 is disposed above the raised part 17B. Moreover, a light guide plate 16 on which this optical sheet 15 is mounted and a reflective sheet 31 are also disposed above the raised part 17B.

A mold frame 140 supports a liquid crystal panel 13 from a back surface of the liquid crystal panel 13 in the same manner as the mold frame 14 described above. The mold frame 140 has a third rib 14C. A tip of the third rib 14C secures a region that disposes the liquid crystal panel 13 by contacting the opposing bezel 12A.

A cushion member 32 formed of resin such as high-density micro-cell polymer sheet (PORON) or silicon is disposed on a front surface and the back surface of the liquid crystal panel 13 and protects the front and back surfaces of the liquid crystal panel 13.

The heat radiating plate 17 has a bent portion 17C configured by bending a metal plate, which increases a surface area of the heat radiating plate 17. A radiating effect of the heat radiating plate 17 is thereby improved.

Meanwhile, an opening 12 with a rim 121A raised in a back surface direction of the liquid crystal display 10 is formed on the opposing bezel 12A by a burring process. A conductive layer is thereby exposed at a tip 1210 of the rim 121A even when the opposing bezel 12A is formed by layering a plating layer on a front and rear surface of the conductive layer.

Moreover, a conductive member 30 is disposed between the raised part 17B of the heat radiating plate 17 and the opposing bezel 12A, making contact with both.

The conductive member 30 is configured of a gasket having conductivity and elasticity. The conductive member 30 therefore is fitted to the raised part 17B of the heat radiating plate 17 and the rim 121A of the opening 121 of the opposing bezel 12A. Moreover, the conductive member 30 electrically connects the heat radiating plate 17 and the opposing bezel 12A because the conductive layer is exposed at the tip of the rim 121A.

It thereby becomes possible to provide the liquid crystal display device 10 that exhibits the same or similar effects as one or more embodiments of the first example described above.

A switch configuration and the display device relating to the present invention are described above based on one or more embodiments, but the present invention is not limited to such embodiments. The present invention may include forms obtained by applying various modifications envisioned by those skilled in the art to the embodiments, and other forms obtained by combining the components of the embodiments.

The present invention is applicable to a device such as, for example, a liquid crystal display device, where electrostatic and/or discharge countermeasures are desired. Although the disclosure has been described with respect to only a limited number of embodiments, those skilled in the art, having benefit of this disclosure, will appreciate that various other embodiments may be devised without departing from the scope of the present invention. Accordingly, the scope of the present invention should be limited only by the attached claims

EXPLANATION OF REFERENCE NUMERALS

10 Liquid crystal display device
12A to 12D Bezel
13 Liquid crystal panel
17 Heat radiating plate
17A Cut and raised portion
17B Raised part
18 Rear frame
30 Conductive member
40 LED bar
120, 121 Opening

What is claimed is:
1. A display device, comprising:
a display that displays images;
a light source assembly that irradiates light from a back side of the display;
a metal material that radiates heat generated by the light source;
a protective part provided in proximity to a perimeter of the display, wherein the protective part is disposed opposite the metal material with a distance separating the protective part and the metal material; and
a conductive part interposed between and electrically connects the protective part and the metal material,
wherein the protective part comprises an opening,
wherein the conductive part is interposed between the protective part and the metal material and blocks the opening, and
wherein all contact between the conductive part and the protective part occurs in a single plane wherein the metal material comprises a cut and raised portion formed in a direction toward the protective part, and the conductive part contacts the cut and raised portion.
2. The display device according to claim 1, wherein the metal material further comprises a raised part formed in a direction toward the protective part, and the conductive part contacts the raised part.
3. The display device according to claim 1, wherein the conductive part is a gasket having conductivity.
4. The display device according to claim 1, wherein the conductive part is elastic.
5. A method for forming a display device, comprising:
providing a light source assembly that irradiates light from a back side of a display;
providing a metal material that radiates heat generated by the light source;
providing a protective part in proximity to a perimeter of the display, wherein the protective part is disposed opposite the metal material with a distance separating the protective part and the metal material; and
interposing a conductive part between and electrically connecting the protective part and the metal material,
wherein the protective part comprises an opening, wherein the conductive part is interposed between the protective part and the metal material and blocks the opening, and wherein all contact between the conductive part and the protective part occurs in a single plane forming a raised part on the material in a direction toward the protective part so that the conductive part contacts the raised part.

6. The method according to claim 5, further comprising:

forming an opening on the protective part; and interposing the conductive part between the protective part and the metal material and blocking the opening.

7. The method according to claim 5, further comprising:

forming a cut and raised portion on the metal material in a direction toward the protective part so that the conductive part contacts the cut and raised portion.

8. The method according to claim 5, wherein the conductive part is a gasket having conductivity.

9. The method according to claim 5, wherein the conductive part is elastic.

\* \* \* \* \*